(12) United States Patent
Poo et al.

(10) Patent No.: US 7,444,159 B2
(45) Date of Patent: Oct. 28, 2008

(54) DATA INPUT DEVICE, SYSTEMS USING THE DEVICE, AND METHODS FOR OPERATING SUCH SYSTEMS

(75) Inventors: Teng Pin Poo, Singapore (SG); Henry Tan, Singapore (SG)

(73) Assignee: Trek 2000 International Ltd., Singapore (SG)

( * ) Notice: Subject to any disclaimer, the term of this patent is extended or adjusted under 35 U.S.C. 154(b) by 735 days.

(21) Appl. No.: 10/871,410

(22) Filed: Jun. 18, 2004

(65) Prior Publication Data

US 2004/0264287 A1 Dec. 30, 2004

(30) Foreign Application Priority Data

Jun. 20, 2003 (WO) .................... PCT/SG03/00152

(51) Int. Cl.
*H04Q 7/20* (2006.01)
*H04Q 7/32* (2006.01)

(52) U.S. Cl. .................... 455/514; 455/550.1; 455/557; 455/556.1; 455/556.2; 455/412.1; 382/115; 382/116; 382/119; 382/181; 382/188; 345/179; 345/180; 345/181; 345/183; 345/166; 235/462.45; 235/462.46; 235/472.01; 235/472.02

(58) Field of Classification Search ............... 455/514, 455/550.1, 556.1, 556.2, 557, 412.1, 412.2, 455/422.1, 403, 414.1, 414.2, 414.3, 575.1, 455/90.3, 500, 517, 466; 382/115, 116, 119, 382/181, 188, 187, 189; 345/179, 180, 181, 345/183, 166; 235/462.45, 462.46, 472.01, 235/472.02

See application file for complete search history.

(56) References Cited

U.S. PATENT DOCUMENTS

| 5,939,702 | A | * | 8/1999 | Knighton et al. | ....... 235/472.03 |
| 6,064,374 | A | | 5/2000 | Fukuzaki | |
| 6,088,730 | A | | 7/2000 | Kato et al. | .................. 709/227 |
| 6,307,956 | B1 | | 10/2001 | Black | .......................... 382/124 |
| 6,336,142 | B1 | | 1/2002 | Kato et al. | .................. 709/227 |

(Continued)

FOREIGN PATENT DOCUMENTS

EP 0 837 406 A2 4/1998

(Continued)

OTHER PUBLICATIONS

European Search Report dated Nov. 11, 2004.

(Continued)

*Primary Examiner*—Keith T Ferguson
(74) *Attorney, Agent, or Firm*—Ostrolenk, Faber, Gerb & Soffen, LLP

(57) ABSTRACT

A data storage device 5 having a storage capacity of at least 8 Mbyte is surrounded by a housing including a stylus portion 23, having a tip 25 for indicating a position. The stylus permits the data storage device 5 to be used for data entry to a electronic device 19 such as a PDA which traces the position of the stylus tip. The data storage device 5 can be used in place of a conventional stylus. Thus, the user of the electronic device 19 which traces the position of a stylus is able to enjoy the advantages of a data storage device without being obliged to use an additional component.

17 Claims, 7 Drawing Sheets

U.S. PATENT DOCUMENTS

| | | |
|---|---|---|
| 6,539,101 B1 | 3/2003 | Black .................... 382/124 |
| 6,563,494 B1 | 5/2003 | Eichstaedt et al. .......... 345/179 |
| 6,573,887 B1 | 6/2003 | O'Donnell, Jr. ............. 345/179 |
| 6,828,960 B2* | 12/2004 | Parry .................... 345/179 |
| 7,010,719 B2 | 3/2006 | Nobuyoshi et al. |
| 2001/0055411 A1* | 12/2001 | Black .................... 382/124 |
| 2002/0131636 A1* | 9/2002 | Hou ..................... 382/181 |
| 2003/0037264 A1 | 2/2003 | Ezaki et al. |
| 2003/0046063 A1 | 3/2003 | Kim ..................... 704/201 |
| 2004/0044897 A1 | 3/2004 | Lim ..................... 713/186 |
| 2004/0134690 A1* | 7/2004 | Norris et al. ............. 178/19.01 |
| 2004/0204066 A1* | 10/2004 | Park .................... 455/556.1 |

FOREIGN PATENT DOCUMENTS

| | | |
|---|---|---|
| EP | 1 079 337 | 2/2001 |
| EP | 1403755 | 3/2004 |
| FR | 2712102 | 5/1995 |
| JP | 05-233125 | 9/1993 |
| JP | 10-214148 | 8/1998 |
| JP | 2000-194830 | 7/2000 |
| JP | 2001-142567 | 5/2001 |
| JP | 2002055956 | 2/2002 |
| JP | 2002297551 | 10/2002 |
| JP | 2003-058509 | 2/2003 |
| JP | 2003099184 | 4/2003 |
| JP | 2003-150415 | 5/2003 |
| KR | 1020010103347 A | 11/2001 |
| SG | 96688 | 1/1992 |
| TW | 385402 | 3/2000 |
| WO | WO 01/08084 | 2/2001 |
| WO | WO 01/61630 | 8/2001 |
| WO | WO 03/003141 | 1/2003 |
| WO | WO 03/003141 A2 | 1/2003 |
| WO | WO 03/019345 | 3/2003 |
| WO | WO 03/091885 | 11/2003 |
| WO | WO 03/102788 | 12/2003 |

OTHER PUBLICATIONS

International Search Report dated Feb. 13, 2004.
UK Search Report dated Jul. 20, 2004.
Australian Office Action dated Oct. 19, 2004.
PCT Written Opinion dated Sep. 1, 2004.
Taiwanese Examination Report dated Jul. 26, 2006 and English translation thereof.
Indian Examination Report dated May 11, 2006.
Chinese Office Action dated Mar. 30, 2007 with English translation.
Japanese Office Action dated Apr. 25, 2007 with English translation.

* cited by examiner

DATA INPUT DEVICE, SYSTEMS USING THE DEVICE, AND METHODS FOR OPERATING SUCH SYSTEMS

FIELD OF THE INVENTION

The present invention relates to a data input device for inputting data to a computer system, and to methods of operating it. The data input device is further arranged to have a data storage function.

BACKGROUND OF INVENTION

Recently there has been great interest in providing data storage devices using which a user is able to transfer data between components of a computer system, or between computer systems.

For example, one of the present inventors has proposed in PCT application PCT/SG01/00136, published as WO 03/003141, entitled "Method and devices for data transfer" (the disclosure of which is incorporated herein by reference) a data storage device for use in a computer system including a computer device and one or more other external electronic devices. The external devices are of the type referred to as "slave devices", and examples of such electronic devices include a camera, a video camera, a organiser, an MP3 player, or a PDA (personal assistant). The data storage device includes a wireless transceiver (transducer) for receiving data (which the data storage device stores), and for transmitting data stored within it. The computer device too, and each of the other electronic devices, includes a respective wireless transducer. Thus, the data storage device can be used for transferring data between the computer device and the various external devices. Since the storage device is substantially devoted to storage of data, it can accommodate a memory which is larger than in most other portable electronic items. Furthermore, since the data transfer is wireless, physical connectors (such as cables, sockets and plugs) are not required, so data can be transferred within the computer system despite the very large number of existing standards for physical connectors.

SUMMARY OF THE INVENTION

Although the data storage device proposed in PCT/SG01/00136 has proved practically useful, it constitutes an additional element which a user of the computer system has to obtain and use (e.g. to carry around when the computer system is to be transported).

The present invention aims to provide a new and useful data storage device.

In general terms, the invention proposes that the data storage device should be shaped in the form of a stylus, that is having a tip for indicating a position. The stylus permits the device to be used for data entry to a electronic device which measures the position of the stylus tip (e.g. a device having a touch sensitive surface). Thus, the data storage device can be used in place of a conventional stylus. In other words, a user of an electronic device which traces the position of a stylus is able to enjoy the advantages of a wireless memory storage device without being obliged to use an additional component.

Specifically, a first expression of the invention is a data storage device having:

a non-volatile memory of at least 8 Mbyte, a wireless transceiver for transmitting and receiving data;

a control processor for storing data received by the wireless transceiver in the memory, and for extracting data from the memory and transmitting it to the wireless transceiver for transmission; and a housing having an outer profile including a stylus portion defining a tip.

Preferably, the data storage device further includes at least one biometric sensor for recording a biometric characteristic of a user, and a verification processor for comparing the biometric characteristic with a characteristic stored by the sensor, the verification processor controlling whether the data storage device performs at least one of its functions in dependence upon whether the recorded biometric characteristic matches the stored characteristic.

For example, the biometric sensor may be a fingerprint sensor, and the data storage device may include a verification processor arranged to compare a fingerprint received by the fingerprint sensor with a stored fingerprint.

Preferably, the data storage device only transmits data stored within it when the verification processor determines that there is a match between the recorded biometric characteristic and the stored characteristic.

Note that it is not indispensable to the invention that the verification processor and control processor are physically different units. The verification processor and the control processor may, if desired, be different functions of a single integrated circuit (master control unit). Alternatively, any other number of integrated circuits may be used to implement together the function of the control processor and verification processor.

The device may include the capability to compress/decompress data which is to be stored, or has been stored, in the non-volatile memory. This can be implemented by the processor which stores data into and retrieves data from the non-volatile memory, or alternatively by a dedicated microprocessor unit.

The device may be integrated with an image capturing device (camera) for generating data which can be stored in the non-volatile memory, and subsequently transmitted through the wireless transceiver.

The device may incorporate at least one smart card, for providing at least one enhanced security feature.

A second expression of the invention is a system including a data storage device as described above, and a first electronic device which is arranged to register the position of the stylus of the data storage device, so that the user can enter data to the first electronic device by moving the stylus, the first electronic device further including a wireless transceiver for exchanging data with the data storage device.

The first electronic device may for example have a surface, and means for detecting the movement of the stylus over the surface. For example, the surface may be touch sensitive.

One possibility is for the first electronic device to be a tablet PC, an organiser or a PDA (personal assistant).

In addition to the first electronic device, the system may comprise one or more further electronic devices which include respective wireless transceivers for exchanging data with the data storage device. Thus, the data storage device may be arranged as a "bridge", which can be used to store data received from a first of the electronic devices and subsequently to transmit that data to a second of the electronic devices (optionally with some processing of the data within the data storage device, such as an encoding operation).

Preferably, the system is a computer system, in which one of the electronic devices is a PC, and other of the electronic devices are "slave devices" of the PC, such as the PDA.

Each of the wireless transceivers preferably operates by electromagnetic waves, and most preferably by RF or infrared waves. In the former case, the transceiver may consist of an antenna and RF interface circuitry. Irrespective of the wireless waves employed, the transceiver may use any protocol presently in existence or which may become available in the future, for example it may be capable of sending and/or receiving signals in at least one of (i) IEEE802.11, (ii) Bluetooth, or (iii) irDA.

It is also possible that the data storage device may be capable of receiving/transmitting in multiple formats, so that it can interpret between two slave devices which use different formats.

Preferably, any of the electronic devices which includes an internal memory is arranged, upon that internal memory becoming full, or at least the amount of data passing a predefined limit, to initiate communication with the data storage device, so that the data can be transferred to the data storage device.

Preferably all communications carried out by the data storage device include a process of establishing the identity of the other device (computer device or slave device) using an ID code received from that device and compared with list of ID codes stored internally by the data storage device.

A third expression of the invention is a method of transferring data between a data storage device of the kind discussed above and another electronic device which incorporates means for tracking the position of the tip of the stylus, the method including at least one of the operations of:

(i) a transceiver of the other electronic device transmitting the data wirelessly to the transceiver of the data storage device, or (ii) the transceiver of the data storage device transmitting the data wirelessly to the transceiver of the data storage device.

BRIEF DESCRIPTION OF THE FIGURES

Preferred features of the invention will now be described, for the sake of illustration only, with reference to the following figures in which.

DETAILED DESCRIPTION OF THE EMBODIMENTS

Figure 1:
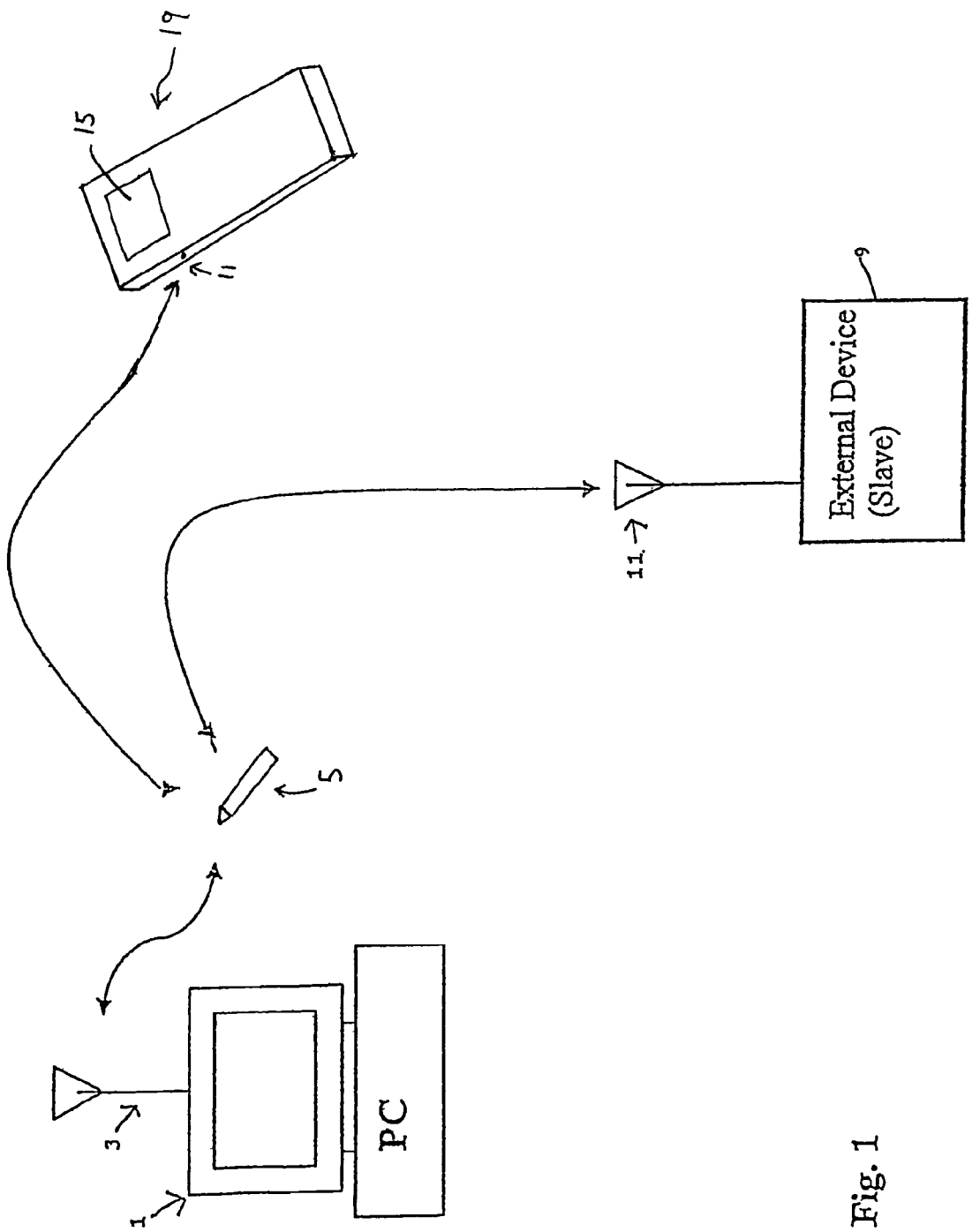
FIG. 1 is a schematic view of a computer system including data storage device which is a first embodiment of the invention.

Referring to FIG. 1, a system embodying the invention includes a PC 1 having an antenna 3. The system also includes a data storage device 5, having an antenna 37 (not shown in FIG. 1). The system further includes a plurality of electronic ("slave") devices 9, 19 which are external to the computer device 1 and spatially separated from it, but which may usefully communicate data to and/or from the PC 1. Each external device 9, 19 has an antenna 11. For simplicity only two slave devices 9, 19 are illustrated in FIG. 1. The data storage device 5 and each of the external devices 9, 19 are portable. For example, their weight is preferably less than 1 kilogram each, and each preferably includes an internal power source such as a battery.

The PC 1 and the data storage device 5 can communicate using the antenna 3 and the antenna of the data storage device 5. Similarly, the data storage device 5 and the external devices 9, 19 can communicate using the antenna of the data storage device 5 and the antennas 11. Both forms of communication may be using any of the communication protocols IEEE802.11, Bluetooth, irDA, etc. As described below, any of the slave devices 9, 19 can send data selectively to the PC 1 or to any of the other slave devices 9, 19 via the data storage device 5. The PC 1 can send data to a selected one of the slave devices 9, 19 via the data storage device. All of this communication is digital, and the data storage device 5 is for digital data. In addition, it is possible that the data may be sent in an encrypted form.

Note that at least one (and possibly all) of the slave devices 9, 19 may not require two-way communication with other slave devices 9, 19 or the PC 1. For example, in the case of a slave device 9 which is a digital camera, the data transmitted via the master storage device 5 may largely (or exclusively) be from the digital camera to the PC 1.

Figure 2A:
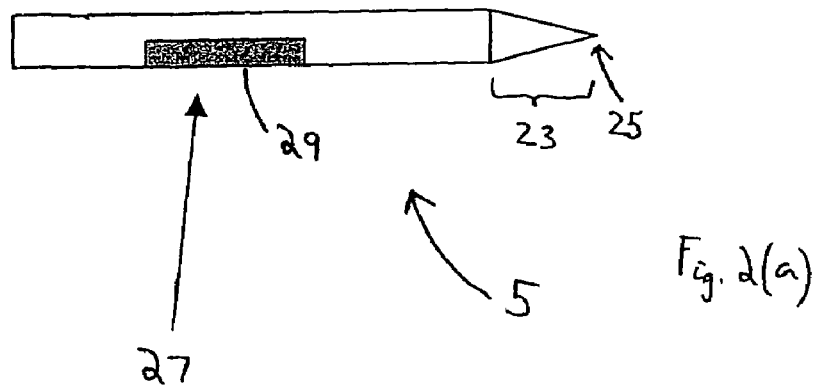
FIG. 2, which is composed of FIGS. 2(a) and 2(b), is schematic views of the data storage device of FIG. 1.
Figure 2B:
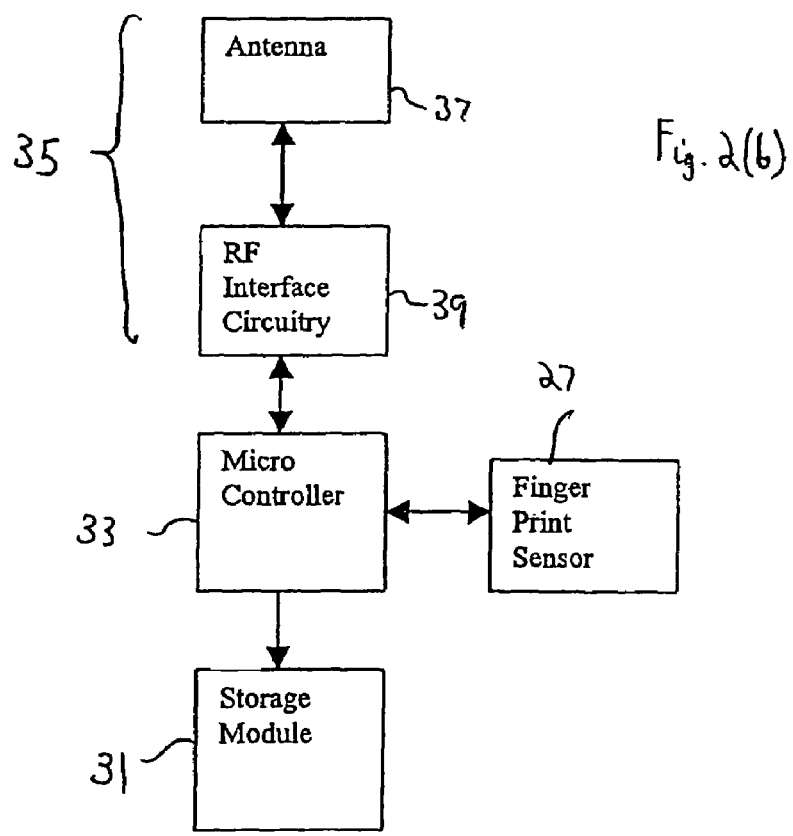

Turning now to FIG. 2, the construction of the data storage device 5 is shown, respectively as a side view (FIG. 2(a)) and as a block diagram (FIG. 2(b)).

The device 5 includes an outer housing including a stylus portion 23 having a tip 25. The antenna of the device 5 is not shown, but is preferably provided at or proximate the end of the device 5 which is opposite from the stylus portion 23 (i.e. at the other end of the housing). The exterior surface of the housing includes a fingerprint sensor 27 having a surface 29 which is substantially plush with the housing. When a user applies his finger to the surface 29, the fingerprint is recorded.

The interior of the data storage device 5 includes a data storage module 31, a microcontroller (master control unit) 33 in two-way communication with the data storage module 31 and with the fingerprint sensor 27. The microcontroller 5 is further in communication with a transceiver 35 comprising an antenna 37 and RF interface circuitry 39. The transceiver 35 is arranged for receiving an RF signal by the antenna 37, and to extract digital data from it in the RF interface circuitry 39, which passes the data to the microcontroller 33, which stores it in the storage module 31. When the data storage device 5 is to transmit data, the microcontroller 33 issues a signal to the storage module 31 which transmits data stored within it to the microcontroller 33, which then passes the data to the transceiver 35 for transmission.

Optionally, the operations of the data storage device 5 (and in particular the operation of transmitting data via the transceiver 35) are only enabled in the case that fingerprint sensor 27 has recorded a fingerprint, transmitted it as fingerprint data to the microcontroller 33, and the microcontroller has compared that fingerprint data to data pre-stored in the storage module 31 (or in some other memory, which is not shown).

The memory capacity of storage module 31 of the data storage device 5 may for example be at least 8 MB, at least 1 GB, at least 10 GB, or at least 20 GB. The storage module 31 of the storage device 5 can be, for example, a magnetic disk drive or any other suitable non-volatile data storage device, such as an electrically erasable programmable read only memory (EEPROM), a ferroelectric random access memory (FRAM), a magetoresistive random access memory (MRAM), or any other data storage device which may become available in the future.

Figure 3:
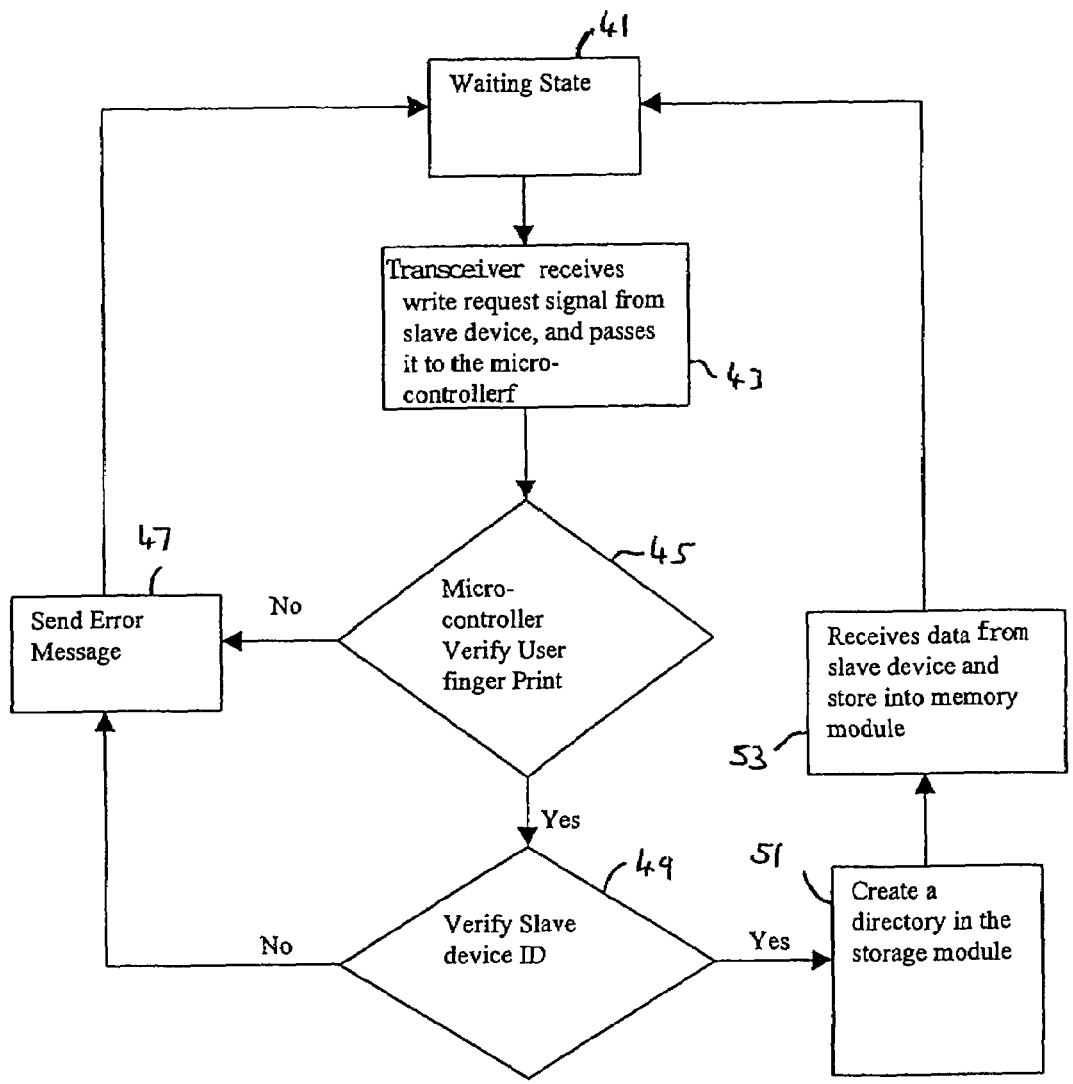
FIG. 3 shows the steps performed by the data storage device in a first method employing the system of FIG. 1.

Turning to FIG. 3, a method using the system of FIG. 1 is shown. In this method, the data storage device 5 receives and stores data from one of the slave devices 9, 19. Initially, the data storage device 5 is in a waiting state 41. In step 43, the transceiver 35 receives data via the antenna 37 from the other of the devices 9, 19, and passes it to the microcontroller 33.

In step 45, the microcontroller 33 uses the fingerprint sensor 27 to verify the finger print of a user holding it. If the measured fingerprint does not match the fingerprint data stored in the storage module 31, an error message is generated in step 47, and the device returns to the waiting state 41.

Otherwise, in step 49, the device verifies an ID (password) of the slave device from the data it received (e.g. comparing the ID encoded in the data with an ID stored in a list in the storage module 31). If this verification process fails, the device moves to step 47. Otherwise, the device passes to step 51 in which the microcontroller 33 creates a directory in the storage module 31, and step 53 in which the device continues to receive data from the slave device 9, 19 and stores it in the storage module 31.

Figure 4:
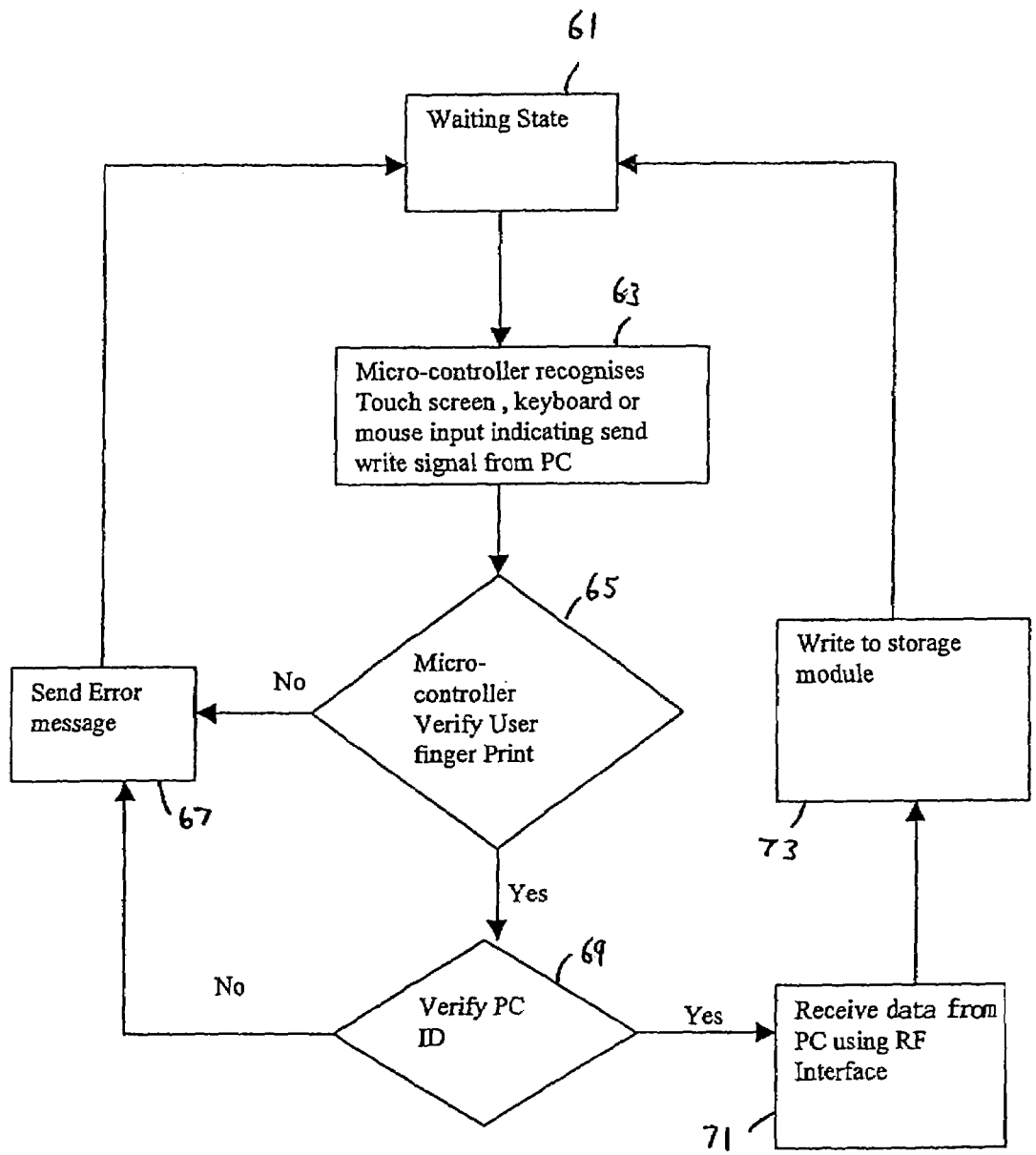
FIG. 4 shows the steps performed by the data storage device in a second method employing the system of FIG. 1.

Turning to FIG. 4, a second method using the system of FIG. 1 is shown. In this method, the data storage device 5 receives and stores data from the PC 1. Initially, the data storage device 5 is in a waiting state 61. In step 63, the transceiver 35 (and thus the microcontroller 33) receives a write request via the antenna 37 from the PC 1 indicating that the user of the PC has used a touch screen, keyboard or mouse input device to signal that data is to be written from the PC 1 to the memory device 5. The receipt of this request also initiates the next process step 65.

In step 65, the microcontroller 33 uses the fingerprint sensor 27 to verify the finger print of a user holding it. If the measured fingerprint does not match the fingerprint data stored in the storage module 31, an error message is generated in step 67, and the device returns to the waiting state 61.

Otherwise, in step 69, the device verifies an ID of the PC 1 within the write request it received (e.g. comparing a ID encoded in the request with an ID stored in the list in the storage module 31). If this verification process fails, the device moves to step 67. Otherwise, the device passes to step 71 in which the microcontroller 33 receives data from the PC 1 using the transceiver 35, and step 73 in which the microcontroller 33 stores the data in the storage module 31.

Figure 5:
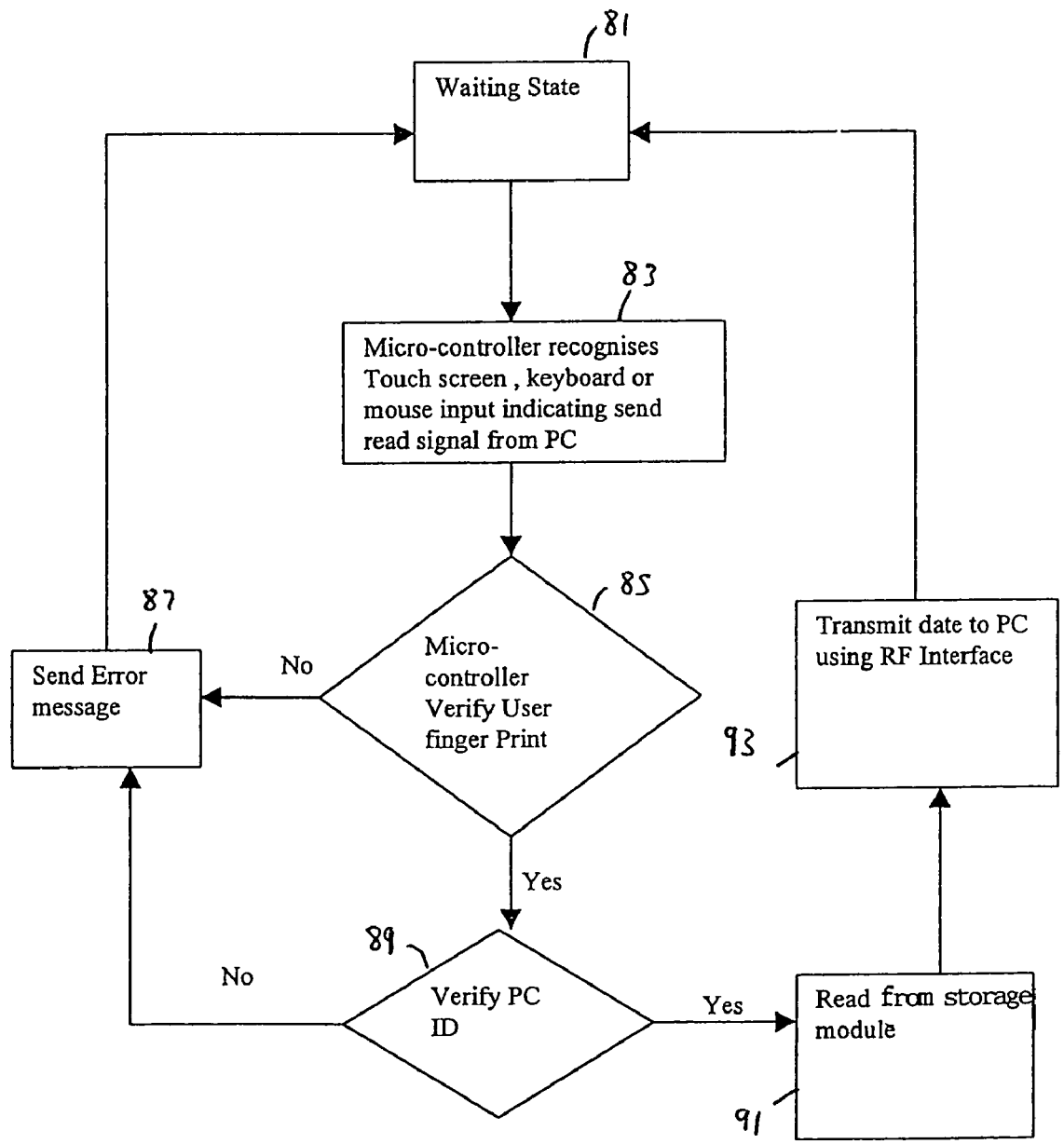
FIG. 5 shows the steps performed by the data storage device in a third method employing the system of FIG. 1.

Turning to FIG. 5, a third method using the system of FIG. 1 is shown. In this method, the data storage device 5 transmits data to the PC 1. Initially, the data storage device 5 is in a waiting state 81. In step 83, the transceiver 35 receives a read request via the antenna 37 from the PC 1 indicating that the user of the PC has used a touch screen, keyboard or mouse input device to signal that data is to be written to the PC 1 from the memory device 5. The receipt of this request also initiates the next process step 85.

In step 85, the microcontroller 33 uses the fingerprint sensor 27 to verify the finger print of a user holding it. If the measured fingerprint does not match the fingerprint data stored in the storage module 31, an error message is generated in step 87, and the device returns to the waiting state 81.

Otherwise, in step 89, the device verifies an ID of the PC 1 within the request it received (e.g. comparing a ID encoded in the request with an ID stored in the list in the storage module 31). If this verification process fails, the device moves to step 87. Otherwise, the device passes to step 91 in which the microcontroller 33 receives data from storage module 31, and in step 93 sends it to the PC 1 using the transceiver 35.

A process very similar to that shown in FIG. 5 occurs in the case that data is to be transmitted to one of the slave devices. It differs in that step 83 is replaced by a step in which the storage device 5 receives a read request from the slave device and passes it to the microcontroller 33, step 89 is replaced by a step in which the identity of the slave device is confirmed using an ID of the slave device, and step 93 is replaced by a step in which the data is transmitted by the transceiver 35 to the slave device.

Figure 6:
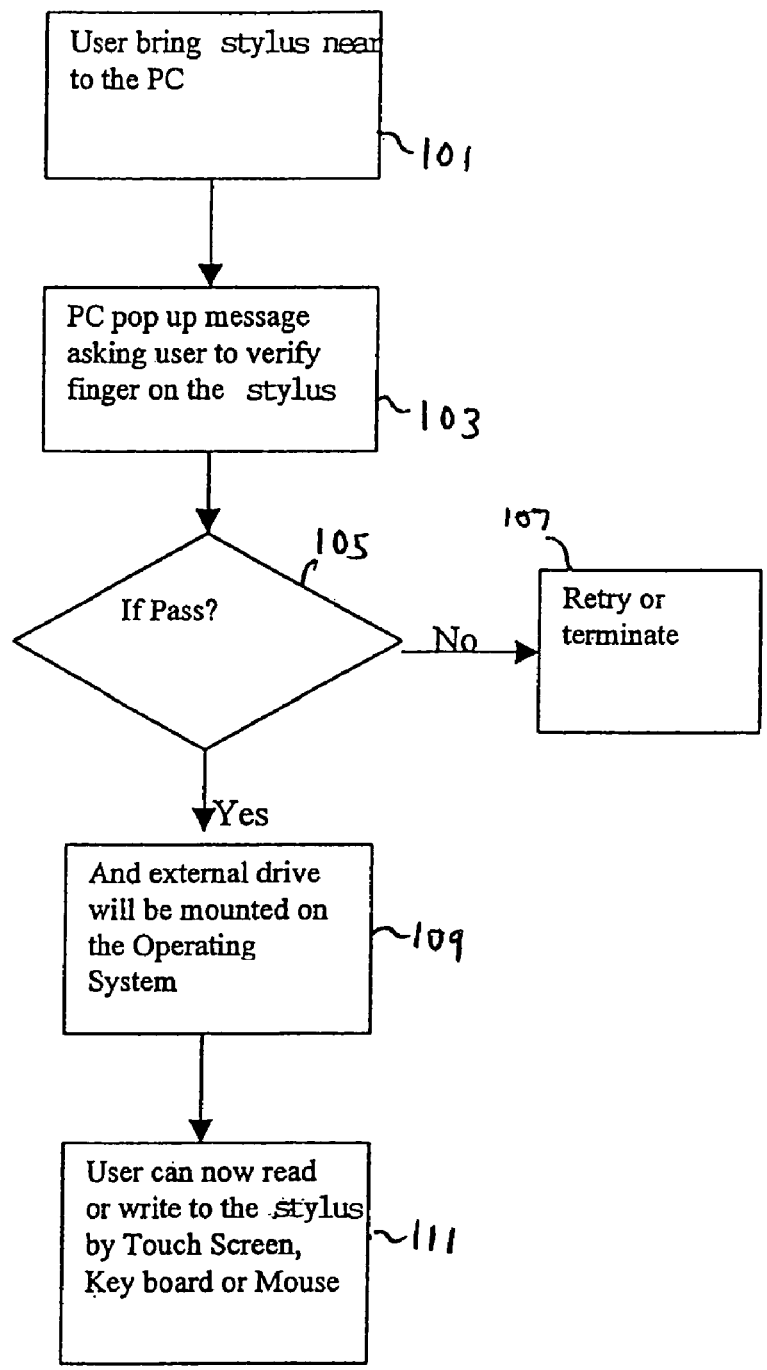
FIG. 6 shows the processes of FIG. 4 or 5 from the point of view of a user.

FIGS. 4 and 5 showed the process of transferring data between the data storage device 5 and the PC 1 from the point of view of the device 5. However, referring to FIG. 6, these processes are shown from the point of view of a user.

In step 101, a user brings the stylus close to the PC, within the range of their respective transceivers 3, 35. In step 103, a pop-up message appears on the screen of the PC asking the user to verify his identity by placing his finger on the sensor 27 of the stylus 5.

In step 105, a determination is made by the microcontroller 33 of whether there is a match. If not, in step 107 the user is invited to retry, or terminate the attempt.

Otherwise in step 109, the operating system of the PC (or other host system) is configured to recognise an external drive (corresponding to the storage module 31), and in step 110 the user can read or write to/from the storage module 31 of the stylus 5 by the touch screen, keyboard or mouse.

In addition to these functions, the user is additionally able to enter data into a electronic device such as the PDA 19 which is able to trace the movements of the tip 25 of the stylus portion 23. The way in which the electronic device 19 tracks the position of the tip 25 may be according to any known technique, or any which may become available in the future. For example, it may be by providing a touch sensitive surface 15 on the PDA 19, so that the user can stroke this surface with the tip 25. Alternatively, the position of the tip 25 may for example be detected by a sonar or radar technique. The user thus has all the functionality available from the stylus of any known system, in addition to the data storage capacity of the data storage device 5.

Figure 7:
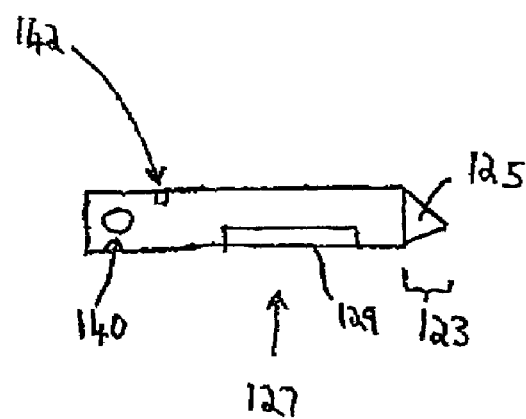
FIG. 7 shows schematically a side view of a data storage device which is a second embodiment of the invention.

FIG. 7 shows a second embodiment of a data storage device according to the invention. Items of FIG. 7 corresponding to those of FIG. 2(a) are given reference numerals 100 higher. The data storage device incorporates a digital camera device 140 within the same housing. The digital camera device 140 is capable of taking images (still images, and/or in certain versions of the embodiment moving images). The device may also include a sound receiving device (microphone) 142 capable of recording audio sound.

Figure 8:
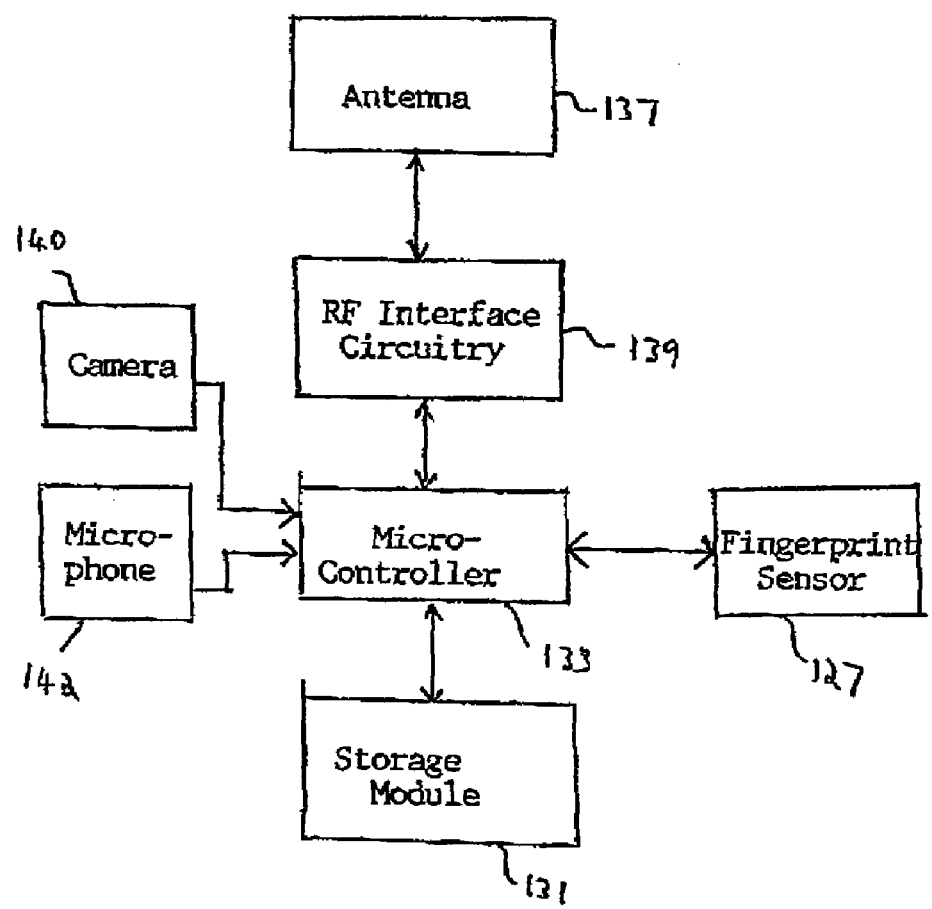
FIG. 8 shows the internal construction of the embodiment of FIG. 7.

The functional structure of the second embodiment is as shown in FIG. 8. Elements corresponding to those of FIG. 2(b) are given reference numerals 100 higher. Data representing the images and/or sound captured by the camera 140 and microphone 142 are stored by the micro-controller 133 in the memory 131. As in the first embodiment, RF interface circuitry is provided, for receiving data from and transmitting data to an antenna 37.

Note that the device preferably has all the functionality of the first embodiment. That is, it is able to receive data via the aerial 137, store it in the memory unit 131, and then retransmit it, so that in this way the data storage device can transfer data among a plurality of devices.

A further possible enhancement of both of the first and second embodiments of the invention is that they may be provided with the capability to compress data which is to be stored in the memory units 31, 131. This is related to the concept discussed in PCT patent application "System and Apparatus for Compressing and Decompressing Data Stored to a Portable Data Storage Device", PCT/SG02/00086, filed 13 May 2002, the entire disclosure of which is incorporated herein by reference. The compression algorithm may for example be stored in a ROM memory and uploaded into the processors 33, 133 and performed there. Alternatively, the device may contain a separate compression engine (not shown).

Optionally, in addition to data compression, the portable storage device is arranged to decompress the data before transmitting out of the device. Again this may be performed by the processors 33, 133, or by a decompression engine, which may in fact by the same microprocessor as the compression engine.

Another possible enhancement of both of the first and second embodiments of the invention is that the device may include some form of "smart card", to provide one or more additional security functions, e.g. to detect some improper usage of the device and, upon this detection, to alter the functioning of the device, for example to inhibit the transmission of data from the memory modules 31, 131 (or indeed to delete all data stored there).

Many forms of smart card are known, including for example cards which can sense that the housing of the device has been opened, and cards which contain identity information. Optionally, for example, the fingerprint sensing described above can be implemented using the smart card.

Note that, although the invention has been described above with reference to only two embodiments, many further variations are possible within the scope of the invention as will be clear to a skilled reader. For example, it is possible for the data storage device 5 to include a physical interface allowing it to be connected to another electronic device or apparatus allowing data to be transmitted into or out of the data storage device respectively from or to the other electronic device via the physical interface. For example, the physical interface may be a plug, such as a USB plug or a Firewire plug, which can be directly connected to a socket in the other electronic device.

Also, the data storage device 5 need not be limited to use within a single computer system, but may be used to transfer data between different computer systems, each of which may have one or more respective PCs and each of which may have one or more slave devices.

The invention claimed is:

1. A data storage electronic device having:
   a non-volatile memory of at least 8Mbyte,
   a wireless transceiver for transmitting and receiving first data;
   a control processor operable to store in the non-volatile memory the first data received by the wireless transceiver, to extract the first data from the memory and to transmit the first data to the wireless transceiver for transmission; and
   a housing having an outer profile including a stylus portion defining a tip,
   wherein the data storage electronic device is operable to receive wirelessly the first data from a second electronic device outside of the data storage electronic device, and to transmit wirelessly the stored first data to the second electronic device, the second electronic device initiating the transmission to and from the data storage electronic device.

2. The data storage electronic device according to claim 1, further comprising at least one biometric sensor operable to record a biometric characteristic of a user, and a verification processor operable to compare the biometric characteristic with a characteristic stored by the biometric sensor, the verification processor controlling whether the data storage electronic device performs at least one of its functions in dependence upon whether the recorded biometric characteristic matches the stored characteristic.

3. The data storage electronic device according to claim 2, wherein the biometric sensor is a fingerprint sensor, and the data storage electronic device includes a verification processor arranged to compare a fingerprint received by the fingerprint sensor with a stored fingerprint.

4. The data storage electronic device according to claim 2, wherein the data storage electronic device is operable to transmit the first data stored only when the verification processor determines that there is a match between the recorded biometric characteristic and the stored characteristic.

5. The data storage electronic device according to claim 1, wherein the data storage electronic device is integrated with a camera device, the camera device being arranged to capture, as image data, data representing an image and to store the image data in the non-volatile memory.

6. The data storage electronic device according to claim 1, wherein the control processor is operable to perform a compression algorithm to compress the first data stored in the non-volatile memory.

7. The data storage electronic device according to claim 1, further including a smart card operable to perform at least one security function in relation to the first data stored in the non-volatile memory.

8. A system comprising:
   (i) data storage electronic device having:
   a non-volatile memory of at least 8Mbyte,
   a wireless transceiver for transmitting and receiving first data;
   a control processor operable to store in the non-volatile memory the first data received by the wireless transceiver, to extract the first data from the memory and to transmit the first data to the wireless transceiver for transmission; and
   a housing having an outer profile including a stylus portion defining a tip; and
   (ii) another electronic device having means to trace a position of the tip of the stylus, and a wireless transceiver for communicating with the wireless transceiver of the data storage electronic device;
   whereby the other electronic data is operable to receive the first data entered by a user movement of the stylus such that the position of the stylus is traced by the other electronic device and the first data is communicated between the other electronic device and the data storage electronic device via the respective transceivers,
   wherein the system is arranged such that the other electronic device is operable by the user movement of the stylus such that the other electronic device traces the position of the tip of the stylus to initiate both the wireless transmission of the data from the other electronic device to the portable data storage electronic device for storage therein and the wireless transmission from the portable data storage electronic device of data stored therein to the other electronic device.

9. The system according to claim 8, wherein the other electronic device includes a surface, and a detection unit operable to detect the movement of the stylus over the surface.

10. The system according to claim 9, wherein the surface is touch sensitive.

11. The system according to claim 8, wherein the other electronic device is an organiser or a PDA (personal digital assistant).

12. The system according to claim 8, comprising one or more further electronic devices which each include a wireless transceiver operable to exchange the first data with the data storage electronic device.

13. The system according to claim 12, wherein the other electronic devices is a PC, and one of the one or more further electronic devices is a slave device of the PC.

14. The system according to claim 12, wherein the storage device is operable to receive and to transmit in multiple formats, whereby the data storage electronic device interprets between the other electronic device and the one or more further electronic devices which use different formats.

15. The system according to claim 12, wherein all communications carried out by the data storage electronic device with the other electronic device and the one or more further electronic devices include a process of establishing an identity of the other electronic device or the one or more further electronic devices using an ID code received from that device by the data storage electronic device and compared with a list of ID codes stored internally by the data storage device.

16. The system according to claim 8, wherein each of the wireless transceivers operates by electromagnetic waves and includes an antenna and RF interface circuitry.

17. A method of transferring first data wirelessly between a data storage electronic device and another electronic device, the data storage electronic device having a housing with an outer profile including a stylus portion defining tip, the method including the steps of:
 a) a user operating the other electronic device to initiate the wireless transfer of the first data from the other electronic device to the data storage electronic device;
 b) the data storage electronic device wirelessly receiving the data;
 c) the data storage electronic device storing the received data in a non-volatile memory of the data storage electronic device having a capacity of at least 8Mbyte; and
 d) the user operating the other electronic device, or a further electronic device, to initiate transmission of the first data from the data storage electronic device to the other electronic device by which the transmission of the first data from the other electronic storage device was initiated; and
 e) the data storage electronic device extracting the first data from the memory and wirelessly transmitting the first data to the other or further electronic device by which transmission was initiated in step (d).

* * * * *